(12) United States Patent
Tanaka

(10) Patent No.: US 8,224,160 B2
(45) Date of Patent: Jul. 17, 2012

(54) OPTICAL DISK REPLAY DEVICE

(75) Inventor: Yoichiro Tanaka, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1483 days.

(21) Appl. No.: 11/545,593

(22) Filed: Oct. 11, 2006

(65) Prior Publication Data

US 2007/0081797 A1    Apr. 12, 2007

(30) Foreign Application Priority Data

Oct. 12, 2005    (JP) .................................. 2005-297330

(51) Int. Cl.
*H04N 5/917*    (2006.01)
(52) U.S. Cl. ......... 386/328; 386/259; 386/326; 386/329
(58) Field of Classification Search .............. 386/45–46, 386/125–126; 725/1–8, 25–31
See application file for complete search history.

(56) References Cited

U.S. PATENT DOCUMENTS

| | | | |
|---|---|---|---|
| 6,782,458 B1 * | 8/2004 | Noble | 711/163 |
| 7,603,722 B2 * | 10/2009 | Lee et al. | 726/31 |
| 2002/0181355 A1 * | 12/2002 | Shikunami et al. | 369/47.12 |
| 2003/0217279 A1 * | 11/2003 | Fuchigami et al. | 713/189 |
| 2004/0255079 A1 * | 12/2004 | Noble | 711/112 |

FOREIGN PATENT DOCUMENTS

| | | |
|---|---|---|
| EP | 1 592 239 A2 | 11/2005 |
| JP | 2002-112172 | 4/2002 |
| JP | 2002-116856 | 4/2002 |
| JP | 2003-259286 | 9/2003 |

* cited by examiner

*Primary Examiner* — Jamie Atala
(74) *Attorney, Agent, or Firm* — Pillsbury Winthrop Shaw Pittman, LLP

(57) ABSTRACT

A disk replay device includes a non-volatile storage unit, which forms a file list from file information including the file name of a compressed video file and the like, and from the number of times that viewing of the file is possible, and stores this file list. At the stage that a disk is set into a disk setting unit, this file list is created based upon information which has been acquired from a compressed video file recorded upon the disk. Moreover, the disk replay device includes a display unit which displays the file list stored in the storage unit, when a predetermined operation is performed by the operator, so that the operator is able to recognize, for each file, the number of times that viewing is possible.

3 Claims, 5 Drawing Sheets

```
┌─────────────────────────────────────────┐
│        FILE  LIST                       │
├─────────────────────────────────────────┤
│           FOLDER NAME                   │
├─────────────────────────────────────────┤
│  REMAINING NUMBER OF TIMES              │
│                                         │
│     1  DIV  ┌────────────────────┐      │
│         X  │ 1 FILE NAME         │      │
│            └────────────────────┘       │
│        DIV                              │
│         X    2 FILE NAME                │
│                                         │
│        DIV                              │
│         X    3 FILE NAME                │
│                                         │
│        DIV                              │
│         X    4 FILE NAME                │
│                                         │
│     5  DIV                              │
│         X    5 FILE NAME                │
│                                         │
└─────────────────────────────────────────┘
```

FIG.4

| FILE LIST |
|---|
| FOLDER NAME |

REMAINING NUMBER OF TIMES

1  DIV X  | 1 FILE NAME |

DIV X  2 FILE NAME

DIV X  3 FILE NAME

DIV X  4 FILE NAME

5  DIV X  5 FILE NAME

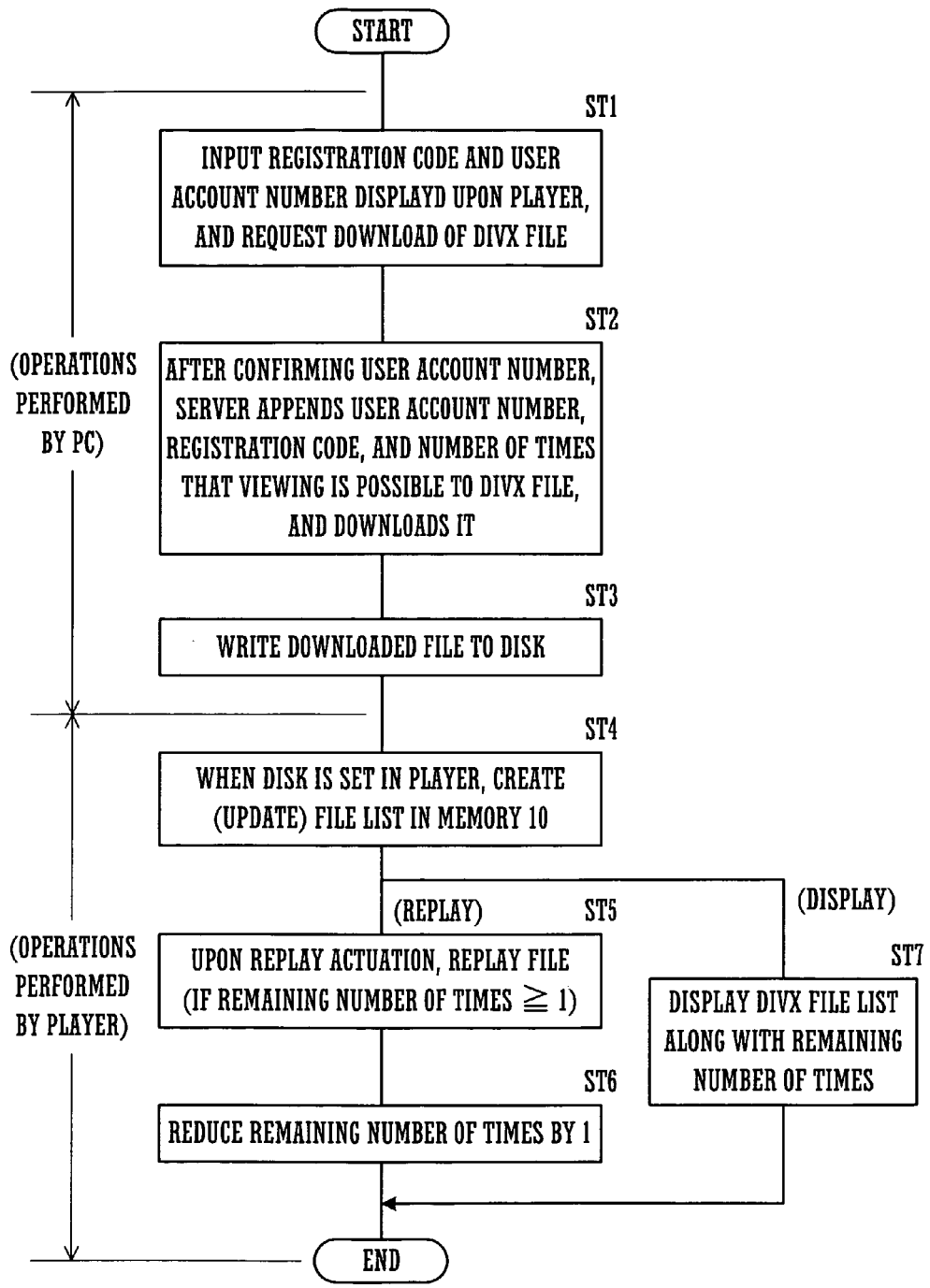

OPTICAL DISK REPLAY DEVICE

CROSS REFERENCE

This Nonprovisional application claims priority under 35 U.S.C. §119(a) on Patent Application No. 2005-297330 filed in Japan on Oct. 12, 2005, the entire contents of which are hereby incorporated by reference.

BACKGROUND OF THE INVENTION

The present invention relates to a replay device for a disk upon which is recorded a compressed video file which can be downloaded from a network, and to a compressed video file replay system.

A disk replay device has been proposed which is capable of recording the contents of a video which is protected by copyright upon an optical disk such as a CD or a DVD or the like, and which, moreover, permits these contents to be viewed only during a limited viewing period or only for a limited number of viewings.

For example, in the case of the device disclosed in Japanese Laid-Open Patent Publication 2002-112172, a device is disclosed which appends information including a limited number of times for viewing (i.e. copy management information) to contents (a compressed video file) downloaded from the internet or the like, and which only permits replay thereof up to this number of times.

Furthermore, in the cases of the devices disclosed in Japanese Laid-Open Patent Publication 2002-116856 and Japanese Laid-Open Patent Publication 2003-259286, devices are also disclosed which, in the same manner, append information including a limited number of times for viewing (i.e. copy management information) to a compressed video file, and which only permit replay thereof up to this number of times.

However, with all of the replay devices disclosed in the Patent Documents described above, there remains the inconvenience that it is not possible for the user to know, at any time that he desires, the number of remaining times that it is possible to view the contents of the downloaded file. For the user to be able to know the number of remaining times that he can view the contents of the file, it is necessary for him to try to replay those contents. If an error occurs during this replay, for the first time, the user can understand that the remaining number of times is zero.

The object of the present invention is to provided a disk replay device, and a compressed video file replay system, with which, even without actually replaying the contents of a disk, it is possible to display the remaining number of times at the present time point that it is possible for the disk to be viewed.

SUMMARY OF THE INVENTION

The disk replay device of the present invention includes a disk setting unit, into which is set a disk upon which is recorded a compressed video file, and a non-volatile storage unit which forms a file list from file information, included in a compressed video file upon a disk which is set into the disk setting unit and including the file name of the file and the like, and from the number of times that viewing of the file is possible, and stores that file list. Furthermore, this disk replay device includes a display unit which, when a predetermined operation is performed, displays the file list which is stored in the storage unit, and a replay unit which replays a compressed video file in which is included a file name selected by the operator from the file list being displayed upon the display unit.

The file list which is displayed by the display unit described above does not only include file information including file names and the like, but also includes the number of times that viewing of these files is possible. Due to this, the operator is able, by looking at this file list, to know the number of times that each of the files can be viewed.

Such a compressed video file is, for example, a file which can be obtained via the internet, and which has been recorded upon a disk such as a CD or a DVD or the like, and which is to be replayed using the disk replay device of the present invention. Although any type of compressed video file will be acceptable, provided that it is one in which the number of times that viewing is possible is appended to the contents as such, nevertheless, for example, Divx files (see http://www.divx.com), which can be compressed to a high degree while still having good picture quality, must be considered. The assumption is that of a business which distributes new cinema releases or the like via the internet to users who have established contracts, by appending the number of times that viewing is possible in this manner as copyright information (i.e. by including that information in the compressed video files).

A user who has established a contract downloads a compressed video file (contents) which he desires from a specified website on the internet, writes it upon a disk such as a CD or a DVD or the like, and sets that disk into the disk replay device according to the present invention. At this time, the replay device is able to replay this compressed video file which is recorded upon the disk, up to the number of times that viewing is possible, as recorded in that compressed video file.

When the storage unit has replayed the compressed video file once with the replay unit, it subtracts one from the number of times that viewing is possible, stored corresponding to the file. Furthermore, the display unit chooses, for the display list, only those compressed video files from the file list stored in the storage unit, for which the number of times that they can be viewed is one or more.

With the structure described above, since files for which the number of times that viewing is possible is zero are not displayed, accordingly it is possible to reduce the necessity for scrolling of the display screen or the like, so that the file list becomes easier to see.

BRIEF DESCRIPTION OF THE DRAWINGS

FIG. 4 is a figure showing an example of a display; and

FIG. 5 is a flow chart showing a procedure for file replay.

DETAILED DESCRIPTION OF THE INVENTION

Figure 1:
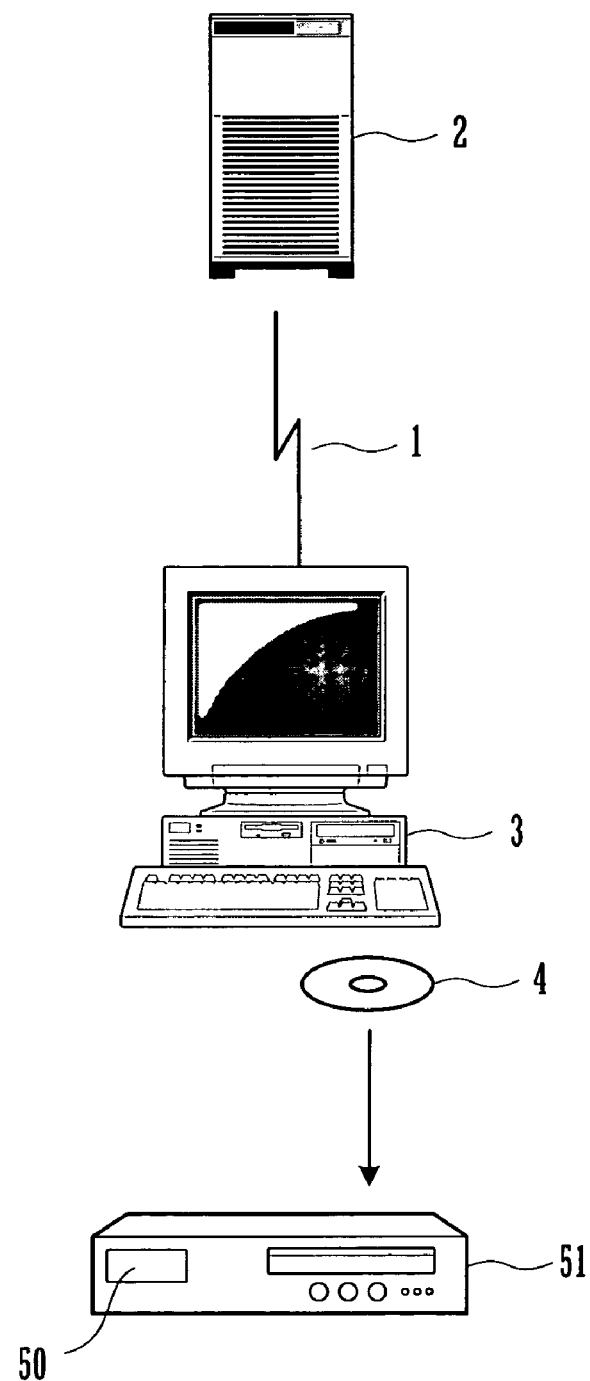
FIG. 1 is a structural diagram of a Divx file replay system employing a Divx player which is an embodiment of the present invention.

FIG. 1 is a structural diagram of a Divx file replay system which is used in a Divx player according to an embodiment of the present invention. Although, in this embodiment, a Divx file is shown as an example of a compressed video file, the compressed video file of this embodiment is not limited to being a Divx file; other types of file may be employed.

Such a Divx file may be downloaded from a Divx server 2 upon the internet 1 to a computer (PC) 3. The Divx file which has thus been downloaded can be recorded upon a CD 4 by the PC 3, and it is possible to replay this file by setting the CD 4 upon which the file has been recorded into a Divx player 51.

A display unit 50 is provided to the Divx player 51, and it is possible to display various information thereon, for example a display of a Divx file list. As will be described hereinafter, such a Divx file list includes file information such as file names, and the number of times that these files can be viewed. Furthermore, a registration code, which has a different value for each download of a Divx file, is also displayed upon the display unit 50.

The procedure will now be explained by which, with the system described above, the user downloads a desired Divx file and replays it on the Divx player.

When the user wishes to download a Divx file, he connects his PC 3 to the server 2 via the internet 1. A Divx website is provided upon the server 2, and various Divx files may be downloaded from this site at will. The operator inputs to this Divx website a user account number with which he has been provided in advance, a registration code which is displayed upon the display unit 50 of the Divx player 51 at this time, and the number of the file which he hopes to download. When it has confirmed that the user account number which has been inputted is a valid account number which corresponds to a valid contract, the Divx server 2 appends the user account number, the registration code, and a number of times that viewing is permitted within the Divx file which the user hopes to download (for example, in the file header section), and downloads this file to the PC 3.

The PC 3 writes the Divx file which has thus been downloaded upon the CD 4. It should be understood that the user account number and the registration code which have been downloaded may also be written in a file which is separate from the main body portion of the Divx file. Thus, it becomes possible for the CD 4 which has been written by the PC 3 to be set into the Divx player 51 and to be replayed. During replay operation, a condition of this replay is that the registration code which is included in this Divx file should agree with the registration code which is allocated to the Divx file player 5.

When the Divx player is performing replay of the Divx file, a new registration code is created at this time point. This code is utilized when downloading the next Divx file.

Figure 2:
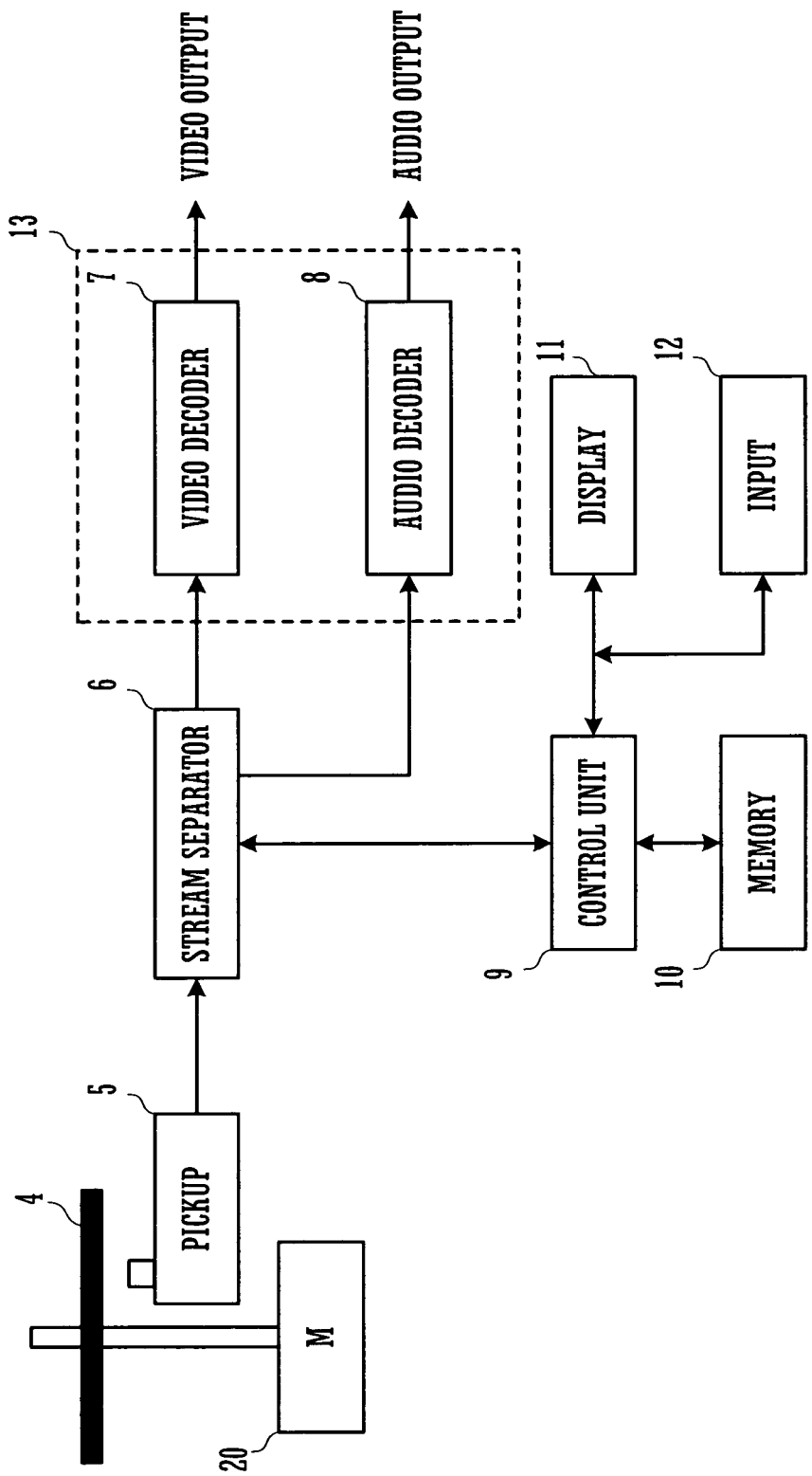
FIG. 2 is a partial structural diagram of this Divx player.

FIG. 2 is a partial structural diagram of the Divx player 51.

The CD 4 is rotationally driven by the motor 20, and the data of the Divx file which is recorded upon the CD 4 is read by the pickup 5, is sent to the stream separator unit 6, and is separated into video (image) data and audio data; and these separated data streams are respectively demodulated by a playing unit 13 including decoders 7 and 8, and are outputted.

Along with performing overall control of the system, the control unit 9 extracts, from the data which has been separated by the stream separator unit 6, file information such as the file name, the user account number, the registration code, and so on, and the number of times that viewing is possible, and stores this as a file list 14 in the memory 10. The memory is a non-volatile memory such as an EEPROM or the like. When a predetermined operation is performed upon an input unit 12 (which may consist of a remote control not shown in the figure and an actuation section), the file name of the Divx file and the number of times that it can be viewed (the remaining number of times) only are extracted from the file list 14 described above, and a file list for display is created, and this is displayed upon the display unit 11. It should be understood that it would also be possible to display all of the information which is contained in the file list 14 stored in the memory 10.

Furthermore, during replay, the control unit 9 updates the file list 14 stored in the memory 10. In other words, it updates the number of times that the file can be viewed, by subtracting 1 from the number of times that viewing is possible in the file list 14, corresponding to the Divx file which is replayed.

Furthermore, the control unit 9 comprises a registration code generation unit which, when the Divx file which has been downloaded has been replayed once, changes its registration code at this time point for a new one. Accordingly, when a subsequent attempt is made by the PC 3 to download a new Divx file, the new registration code which has been generated by this registration code generation unit is used. Accordingly, a different registration code is appended to each of the Divx files. The registration codes which are generated in this manner by the Divx player 51 each time a Divx file is downloaded are stored in a specified region within the memory 10, which is different from the storage region for the file list 14, described above.

Figure 3:
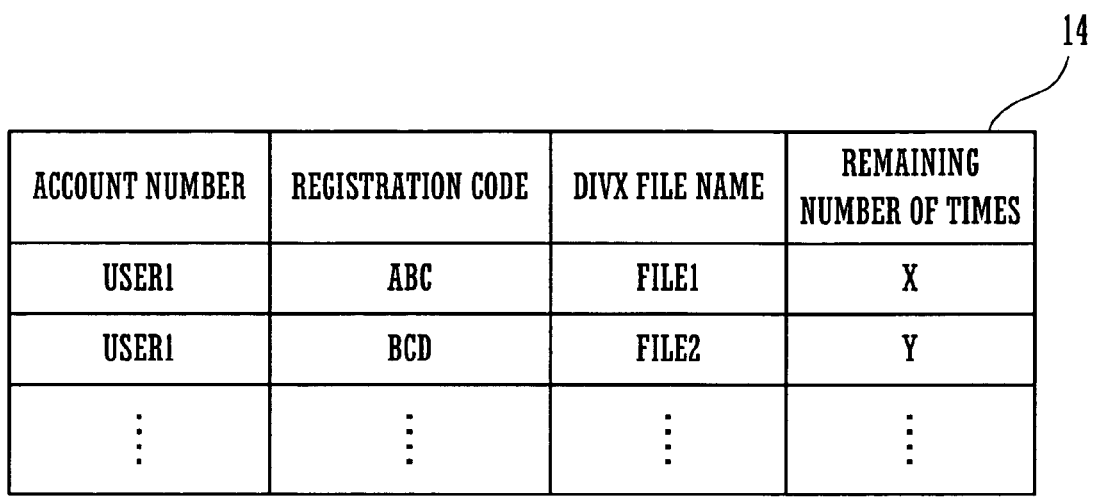
FIG. 3 is a figure showing an example of a Divx file list.

FIG. 3 shows an example of such a file list 14.

As shown in this figure, the account number (the user account number), the registration code, the file name, and the number of times that viewing is possible (i.e. the remaining number of times) are stored in correspondence to one Divx file. When a file list display command is inputted upon the input unit 12, the Divx file names and the number of times that viewing of them is possible, only, are extracted from this file list 14, and a file list for display is created and is displayed upon the display unit 11. Furthermore, when replaying any desired Divx file, the number of times that this file can be viewed is decreased by one. When displaying the file list, only files for which the number of times that viewing is possible is one or greater are displayed. Normally, from the point of view of the operator, it is more convenient to display only those files that can be replayed, rather than displaying all of the files including those files which cannot be replayed. This is because, in this case, the possibility that the screen will need to be scrolled is reduced, and moreover it becomes easier to find the file which is desired. Thus, only those files in the file list 14 of all the files stored in the memory 10 for which the number of times that viewing is possible is greater than zero are selected, and are put into the file list for display which is created, and are then displayed. Due to this, the operability by the operator is enhanced.

It should be understood that it would also be possible to display the entire file list 14 stored in the memory 10.

FIG. 4 shows an example of a file list which is displayed upon the display unit 50.

In the example shown in the figure a total of five files are displayed, and here it is shown that, for the uppermost file and for the lowermost file, the number of times that viewing is possible is respectively 1 and 5, while no particular limitation is imposed upon viewing the other files. Files for which the number of times that viewing is possible has become zero are not displayed.

FIG. 5 shows the sequence of operations, from a download operation for a Divx file to replay thereof.

In a step ST1, the operator connects the PC 3 to a Divx server 2 via the internet, and inputs, to a Divx website, the registration code which is displayed upon the display unit 50 of the Divx player 51 (which may be displayed by a predetermined operation) and the user account number which has been allocated in advance, along with the Divx file name which he desires, and requests a download.

In a step ST2, after having confirmed that the user account number is a valid account number for which a valid contract is in force, the server 2 appends the user account number, the registration code, and the number of times that viewing is possible (or information which corresponds thereto) within the Divx file which has been requested, and downloads it to the PC 3.

In a step ST3, the PC 3 writes the file which it has downloaded to a CD 4. The above steps ST1 through ST3 are procedures which the user performs upon his PC 3.

In a step ST4, at the stage that the CD4 has been set into the Divx player 51, the player 5 creates (updates) the file list of the Divx files in the memory 10.

In a step ST5, when the user performs actuation for replay, the Divx player performs replay of the Divx file which has been designated. At this time, a condition for replay to be performed is that the registration code for the Divx file which is recorded upon the CD 4 and the registration code which has been allocated to the Divx player 51 when this file was downloaded (which is stored in the memory 10) agree with one another.

In a step ST6, the number of times that replay is possible in the file list 14 corresponding to the file which has been replayed is reduced by 1, and updating thereof is performed.

Furthermore, when a command to display the file list 14 is inputted on the input unit 12, then, in a step ST7, a file list for display upon the display unit 11 is created from the file list 14 stored in the memory 10, and this is displayed. Since the number of times that viewing is possible is included in this file list, at this time, the user is able to see a file list in a display format like that shown in FIG. 4. It should be understood that files for which the number of times that viewing is possible is zero are not displayed. Furthermore, from the point of view of security, the user account number and the registration code are also not included in the display contents.

Since, by doing the above, the user is able to know the number of times that it is possible to view a Divx file which he has downloaded, when he so desires, Finally, in the above described explanation of an embodiment of the present invention, all of the features are shown by way of example, and should not be considered as being limitative of the present invention. The scope of the present invention is not to be defined by any of the features of the embodiment described above, but only be the scope of the appended Claims. Moreover, equivalents to elements in the Claims, and variations within their legitimate and proper scope, are also to be considered as being included within the range of the present invention.

What is claimed is:

1. An optical disk replay device, comprising:
    a disk setting unit, into which is set an optical disk having a compressed video file recorded thereon;
    a control unit which extracts, from the compressed video file recorded on the optical disk set into the disk setting unit, a file name and viewable number of times of the compressed video file, and creates a file list in which the file name and the viewable number of times correspond to each other;
    a non-volatile storage unit which stores the file list containing the file name and viewable number of times created by the control unit;
    a display unit which, when a predetermined operation is performed, chooses and displays only compressed video files for which the viewable number of times is greater than or equal to 1 from the file list stored in the storage unit; and
    a replay unit which replays the compressed video file of the optical disk including the file name selected by an operator from the file list being displayed upon the display unit,
    wherein when the replay unit replays the compressed video file once, the control unit subtracts 1 in the file list from viewable number of times which corresponds to the file name of the compressed video file.

2. The optical disk replay device as described in claim 1, further comprising:
    a registration code generation unit which, when issuing a request to a download destination to download a compressed video file via internet, generates a registration code and transmits the registration code to the download destination; and
    a registration code storage unit which stores the registration code generated by the registration code generation unit,
    wherein the replay unit replays the compressed video file including the file name selected by the operator, only when a registration code included in the compressed video file on the optical disk set in the disk setting unit agrees with a registration code stored in the registration code storage unit.

3. The optical disk replay device as described in claim 2, wherein, each time a request is issued for download of a compressed video file via the internet, the registration code generation unit generates a registration code with a different value.

* * * * *